This Patented Aug. 4, 1970

3,523,105
PROCESS OF CONDENSING POLYALKYLENE TEREPHTHALATES USING ZINC SULPHIDE AS A CONDENSATION CATALYST

William L. Hergenrother, Akron, Ohio, assignor to The Firestone Tire & Rubber Company, Akron, Ohio, a corporation of Ohio
No Drawing. Continuation-in-part of application Ser. No. 431,193, Feb. 8, 1965. This application Apr. 1, 1968, Ser. No. 718,008
Int. Cl. C08g 17/015
U.S. Cl. 260—75    2 Claims

ABSTRACT OF THE DISCLOSURE

There is provided an improvement in the process of making high molecular weight poly(alkylene terephthalates) which involves the inclusion of trace amounts of zinc sulfide in the polymerizable body as a condensation catalyst, and effecting condensation at an elevated temperature.

RELATED APPLICATIONS

This application is a continuation-in-part of the applicant's copending application Ser. No. 431,193 filed Feb. 8, 1965.

PROCESS

The present invention is an improvement on the process making linear poly (alkylene terephthalates), and in particular an improvement on the process of Whinfield and Dickson as set forth in U.S. Pat. No. 2,465,319, the disclosure of which patent is included in its entirety in the present disclosure by reference.

It has been found that high molecular weights for poly (alkylene terephthalates) may be obtained, for example, upwards of 16,000 for poly (ethylene terephthalate), by utilizing virtually trace amounts of zinc sulphide as the catalyst during the condensation portion of the reaction. It has also been found that color of the polymer is improved, thereby rendering the product more suitable for use in the manufacture of textiles. The improved color and the improved molecular weight with the resulting increase in tensile strength provides a product which is useful in making textile materials, especially tire cord material. Zinc sulphide is stable in the reaction environment and suitable for use in carboxyl terminated linear chains and for use in hydroxyl terminated linear chains. Moreover, zinc sulphide is nonreactive in the reaction system and contributes no chain stopping component, and no color-producing bodies. The product is not delustered or pigmented when catalytic amounts in accordance herewith are used.

Poly (alkylene terephthalate) resins are particularly sensitive to impurities or contaminants in the reactants, and molecular weight and tensile strength are each dependent to a considerable extent on purity of the reactants and the amount and nature of catalytic materials employed. Catalysts which are reactive or decomposable under certain conditions of the reaction, e.g. elevated temperatures, adversely affect the product by providing chain stopping ingredients which limits the molecular weight. Metallic catalysts often react sufficiently to provide chain stopping atoms as do various organic catalyst materials.

This invention is applicable to the production of linear poly (alkylene terephthalates) melting above 240° C. and characterized by terminal —OH groups (utilizing an excess of alkylene glycol) or linear poly (alkylene terephthalates) melting above 240° C. characterized by terminal —COOH groups (utilizing an excess of terephthalic acid). The polymers are formed from reaction mixtures consisting of the terephthalate radical donor, the alkylene radical donor and a catalyst or mixture of catalyst in a very small amount.

Briefly stated, therefore, the present invention is in a process of thermally condensing a glycol terephthalate having a melting point below 240° C., which has been improved by conducting such thermal condensation in the presence of a catalytic amount of zinc sulphide. In general, the amount of zinc sulphide is equivalent to from $2 \times 10^{-4}$ to $2 \times 10^{-3}$ moles of zinc sulphide per mole of terephthalic acid, or .012 part of zinc sulphide per 100 parts of terephthalic acid to .12 part per 100 parts of terephthalic acid.

Generally speaking, the polymers of the present invention are conveniently, although not essentially, formed by heating and reacting an ester of terephthalic acid and a monohydric alcohol having the formula R—OH where R is an alkyl group containing from 1 to 7 carbon atoms, with an excess of a polymethylene glycol having the formula $HO(CH_2)_nOH$, where $n$ is a whole number from 2 to 10, said glycol having a boiling point above the boiling point of the monohydric alcohol. To effect the alcoholysis reaction, the heating is carried out in the presence of an ester interchange catalyst. Alcohol formed in the course of the reaction is removed by maintaining the temperature above the boiling point of the alcohol. There results a glycol terephthalate having a relatively low molecular weight as indicated by its relatively low melting point which is below 240° C. and usually below about 175° C. The amount of intermolecular condensation at this stage is low, the number of polymer units ranging from 1 to about 10. This product is further heated to a temperature above its melting point to produce a higher molecular weight polymer and evolve polymethylene glycol. The heating is continued until a stage is reached at which filaments formed from the mass possess property of cold drawing. The procedure to this point is well known as illustrated by the Whinfield et al. patent, supra. Any suitable known method of making the glycol terephthalate may be employed. When the further heating of the glycol terephthalate is carried out in the presence of a small amount of zinc sulphide, preferably in the powdered form, there results a high molecular weight, high tensile strength product having low color particularly useful for the production of textile materials and having a melting point of at least about 240°.

Instead of proceeding through an alcoholysis reaction which is a preferred mode of making the pre-polymer material, the polymers may be prepared by heating glycols having the general formula given above with terephthalic acid, or other terephthalic acid bodies to form glycol esters. Such other terephthalic acid bodies include the terephthalic acid dihalides, including the dichloride, dibromide, and the diiodide, of which the dichloride is preferred.

The monohydric alcohol esters of terephthalic acid may be dimethyl terephthalate, diethyl terephthalate, dipropyl terephthalate, dibutyl terephthalate, diamyl terephthalate, dihexyl terephthalate, and diheptyl terephthalate. Branched chain alcohols containing from 3 to 7 carbon atoms may also be used and are often preferred because of their greater ease of removal. For most purposes, however, the dimethyl terephthalate is used as the reactant from which the glycol terephthalate is formed.

The glycol which may be used in accordance herewith may be selected from ethylene glycol, trimethylene glycol, tetramethylene glycol, pentamethylene glycol, hexamethylene glycol, heptamethylene glycol, octamethylene glycol, nonamethylene glycol and decamethylene glycol. It is advantageous to use glycols having 2 to 4 methylene groups since these materials give highly polymerized esters with very high melting points. Ethylene glycol is preferred for reasons of cost and availability. Mixtures of glycols may be used if desired.

The prior art is replete with examples of the formation of glycol terephthalates either by direct esterification or by alcoholysis and it will be understood that no invention is claimed in respect of forming the glycol terephthalate. It will also be understood that the starting glycol terephthalates may be di(hydroxyalkyl) terephthalates, low molecular weight polyesters formed therefrom, and mixtures thereof. It is convenient to set forth illustrative examples in accordance with the present invention:

EXAMPLE 1

A low molecular weight poly (ethylene terephthalate) was formed by reaction 150 grams terephthalic acid and 89 grams of ethylene glycol were condensed to form a pre-polymer by direct esterification until solution was effected. A mixture of 100 grams of such low molecular weight (approx. 1000) poly (ethylene terephthalate) and 0.0400 gram of zinc sulphide powder ($1.19 \times 10^{-3}$ mol ZnS per mol of terephthalic acid) was heated in nitrogen to 275° C. After removal of the excess ethylene glycol, a pressure of 0.08 to 0.15 mm. of mercury was gradually applied and the heating was continued for 3 hours at 275°–285° C. Upon cooling, a cream-colored polyester was obtained having a relative viscosity of 1.35 and an intrinsic viscosity of 0.64. This material could be cold drawn to provide filaments useful in forming textile materials.

EXAMPLE 2

A mixture of 97 grams of dimethyl terephthalate, 62 grams of ethylene glycol, 12 milligrams of zinc acetate dihydrate was placed in a 200 ml. round bottom flask. The mixture was heated and the temperature slowly raised to 280° C. while the methanol and excess glycol were collected by distillation. At this point, 40 milligrams of zinc sulphide ($1.20 \times 10^{-3}$ mol ZnS per mol terephthalic acid) were added. The pressure was then slowly lowered to 0–2 mm. mercury and for the next 3 hours the reaction was continued at 275°–285° C. under a pressure of 0.10 to 0.17 mm. of mercury.

Upon cooling a white hard polymer was obtained having a relative viscosity of 1.31 and an intrinsic viscosity of 0.57. This material had the property of cold drawability into filaments.

EXAMPLE 3

100 grams of a poly (ethylene terephthalate) pre-polymer, average molecular weight 1000, were placed in a 200 ml. round bottom flask together with 60 milligrams of zinc sulphide powder ($1.79 \times 10^{-3}$ mol ZnS/mol terephthalic acid). The mixture was heated to 275° C. and the pressure gradually reduced to between 0.9 and 0.15 mm. of mercury. The reaction was continued at the reduced pressure for a period of 3 hours at 275° to 285° C. Upon cooling a cream-colored block of polyester was obtained having a relative viscosity of 1.45 and an intrinsic viscosity of 0.79. This material could be cold drawn to provide filaments useful in forming textile materials.

EXAMPLE 4

Following the same procedure set out in Example 1, $6.2 \times 10^{-4}$ mole of zinc sulphide per mole of terephthalic acid was admixed with 100 grams of the same pre-polymer. The mixture was heated to 275° C. in the presence of nitrogen and the pressure gradually reduced to 0.08 to 0.15 mm. Hg. The condensation was continued at the reduced pressure for 3 hours. Upon cooling, a hard cream-colored block of cold drawable polyester was obtained having a relative viscosity of 1.28 and an intrinsic viscosity of 0.51.

EXAMPLE 5

Following the same procedure set out in Example 1, $2 \times 10^{-4}$ mole of zinc sulphide per mole of terephthalic acid was admixed with 100 grams of the same pre-polymer. The mixture was heated to 275° C. in the presence of nitrogen and the pressure gradually reduced to 0.08 to 0.15 mm. Hg. The condensation was continued at the reduced pressure for 5 hours. Upon cooling a cream-colored block of cold drawable polyester was obtained having a relative viscosity of 1.46 and an intrinsic viscosity of 0.80.

The procedure of this invention yields polyester products having an intrinsic viscosity of from 0.5 upwards. For most purposes, intrinsic viscosities in the range of 0.55 to 1.0 provide the most useful products. The intrinsic viscosities are calculated from relative viscosity measurements using the Billmeyer equation. To determine the relative viscosity, the solvent used was a 50:50 mixture by weight of phenol and tetrachloroethane. The concentration was 0.5 gram of resin/100 ml. of solvent, and the measurement made at 25° C. (See Conix, Die Macromoleculare Chemie, vol. 26, page 226, 1958.) An intrinsic viscosity of 0.6 is equivalent to a molecular weight of about 16,000 and an intrinsic viscosity of 1.0 is equivalent to a molecular weight of about 30,000.

In preparing the condensation products according to the process of this invention, best results are secured if the zinc sulphide is added after formation of a low molecular weight prepolymer, e.g. one having a molecular weight of no more than about 1,000.

The mode of preparation of the pre-polymer is immaterial to the present invention so long as the usual precautions respecting the purity of the reactants are observed.

In general, the amount of zinc sulphide catalyst useful in accordance with this invention is a catalytic amount, and its residual presence in the final product because of the extremely small amount does not impair the properties of the final product. The amount as above indicated is generally in the range of from about $2 \times 10^{-4}$ to about $2 \times 10^{-3}$ moles of zinc sulphide per mole of terephthalic acid. The condensation procedure is desirably carried out in an inert atmosphere.

From the foregoing examples it will be clear that other specific examples illustrating the use of other polymers could be recited without altering the steps of the process. Other polymers may be treated in the same manner with the same quantities of zinc sulphide. The temperatures will, of course, be different in view of the different boiling points of the glycols and alcohol which may be used. In all other respects, the procedure with such other polymers remains essentially the same.

What is claimed is:

1. In the process for making highly polymeric poly (alkylene terephthalates) having an intrinsic viscosity of from 0.55 to 1.0 and which are capable of being formed into filaments having cold drawing properties which process includes the steps of heating and reacting an ester of terephthalic acid and an alcohol of the formula R—OH where R is a $C_1$–$C_7$ alkyl group with an excess of a polymethylene glycol having the formula HO(CH$_2$)$_n$OH wherein $n$ is from 2 to 10, said glycol having a boiling point above the boiling point of said alcohol, in the presence of an ester interchange catalyst, removing the alcohol formed by the reaction by heating to temperatures above the boiling point of said alcohol, then further heating the resulting glycol terephthalate at a temperature above its melting point to produce a high polymer, removing the polymethylene glycol which is liberated, and continuing the heating until a stage is reached at which filaments formed from the mass possess the property of cold drawing, the improvement which comprises carrying out the step of further heating at a temperature above the melting point, in the presence of from $2 \times 10^{-4}$ to $2 \times 10^{-3}$ moles of zinc sulphide per mole of terephthalic acid as a condensation catalyst to raise the molecular weight of said resulting glycol terephthalate from about 1,000 to from about 16,000 to about 30,000, without substantially delustering or pigmenting the product.

2. In the process of making a poly (alkylene terephthalate) having an intrinsic viscosity of from 0.5 to 1.0, the improvement which comprises condensing at an elevated temperature said poly (alkylene terephthalate) in the presence of an amount of zinc sulphide equivalent to from $2 \times 10^{-4}$ to $2 \times 10^{-3}$ moles of zinc sulphide per mole of terephthalic acid as a condensation catalyst to raise the molecular weight of said poly (alkylene terephthalate) from about 1,000 into the range of from about 16,000 to about 30,000, without substantially delustering or pigmenting the product.

References Cited

UNITED STATES PATENTS

| | | | |
|---|---|---|---|
| 2,465,319 | 3/1949 | Whinfield | 260—75 |
| 2,556,295 | 6/1951 | Pace | 260—75 |
| 3,110,547 | 11/1963 | Emmert | 260—75 |

FOREIGN PATENTS 610,137  10/1948  Great Britain.

OTHER REFERENCES

Journal of Polymer Science XXXV (1959) pp. 309–313 article by Haseley.

WILLIAM SHORT, Primary Examiner

L. P. QUAST, Assistant Examiner

PO-1050
(5/69)

UNITED STATES PATENT OFFICE
CERTIFICATE OF CORRECTION

Patent No. __3,523,105__　　　　Dated __August 4, 1970__

Inventor(s) __William L. Hergenrother__

It is certified that error appears in the above-identified patent and that said Letters Patent are hereby corrected as shown below:

Col. 1, line 27, after "1965" insert --now abandoned-- line 29, after "process" insert --of--

Signed and sealed this 11th day of January 1972.

(SEAL)
Attest:

EDWARD M. FLETCHER, JR.　　　　ROBERT GOTTSCHALK
Attesting Officer　　　　　　　　Acting Commissioner of Patents